April 15, 1947.  R. W. BARGGREN  2,418,864
LATHE DOG
Filed Dec. 4, 1944
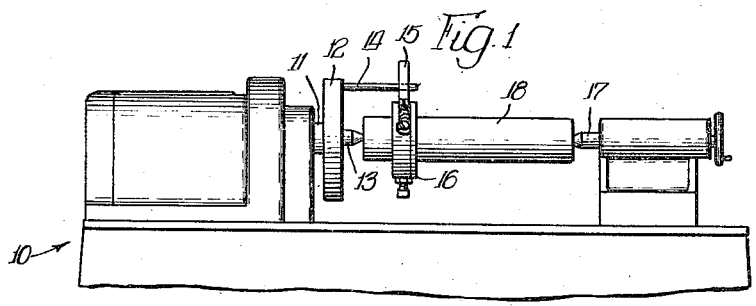
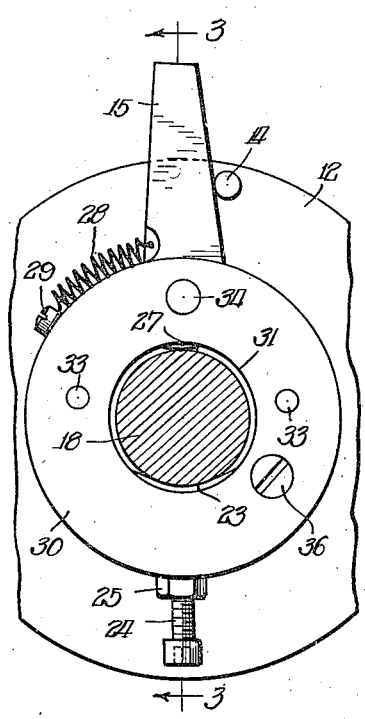
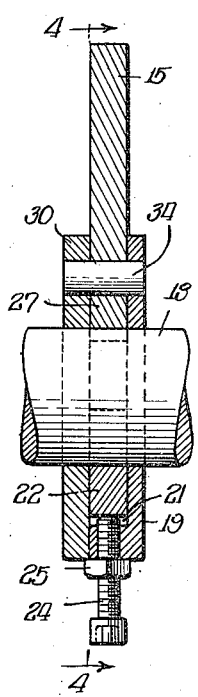
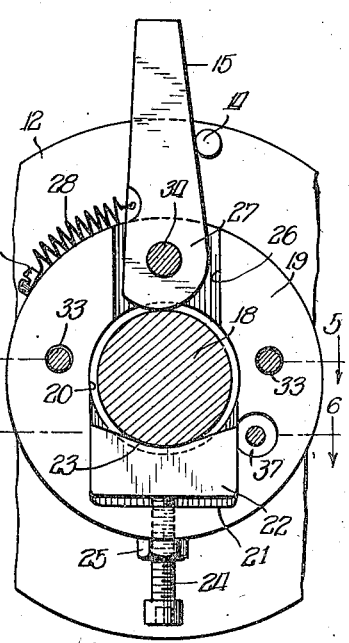
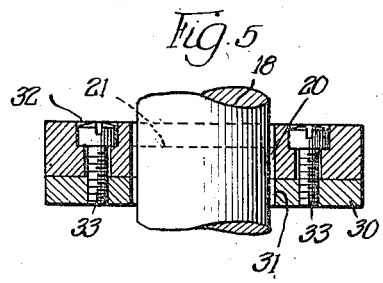
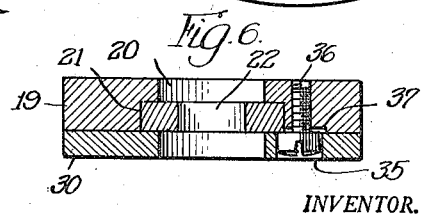
INVENTOR.
Richard W. Barggren,
BY Patented Apr. 15, 1947

2,418,864

UNITED STATES PATENT OFFICE 2,418,864

LATHE DOG

Richard W. Barggren, Niles, Ill., assignor to Dan L. Klein, Grand Rapids, Mich.

Application December 4, 1944, Serial No. 566,433

1 Claim. (Cl. 82—42)

The present invention relates to lathe dogs and has for its main object the provision of a lathe dog which is simple in construction and operation and which is automatic in gripping the work without the requirement of screws.

A still further object of the present invention is the provision of a lathe dog of simplified construction and which would require the minimum of parts.

With the above general objects in view and others that will appear as the invention is better understood, the same consists in the novel construction, combination and arrangement of parts hereinafter more fully described, illustrated in the accompany drawing and pointed out in the appended claim.

In the drawing forming a part of this application and in which like designating characters refer to corresponding parts throughout the several views:

Fig. 1 is a side elevational view of a lathe with the work in an operative position, and the lathe dog in an operative position upon the work;

Fig. 2 is an enlarged cross-sectional view through the work, showing the lathe dog and face plate in a side elevation;

Fig. 3 is a cross-sectional view through the lathe dog on line 3—3 of Fig. 2;

Fig. 4 is a cross-sectional view on line 4—4 of Fig. 3;

Fig. 5 is a cross-sectional view on line 5—5 of Fig. 4; and

Fig. 6 is a cross-sectional view on line 6—6 of Fig. 4.

Referring in detail to the present drawing there is shown a lathe generally indicated by 10, having a driven shaft 11, with face plate 12 rigidly carried by said shaft 11 and a work-engaging pin 13 formed centrally of said face plate 12. Said face plate 12 carries an off-centrically positioned pin 14, the latter engaging cam lever 15 of lathe dog generally indicated by 16 in Fig. 1. Pin 13 as well as adjustable pin 17 engage work 18. Dog 16 is inserted over work 18 and through the medium of pin 14 and cam lever 15 rotary movement to work 18 is imparted from face plate 12. This is the known use, object and purpose of a lathe dog, and to which no claim is made.

My invention resides entirely in the novel and useful construction of the lathe dog itself, which includes an annular base 19, having a transverse central bore 20 of a suitable diameter within which work 18 is adapted to enter, and within which the same is adapted to be clamped by means later described.

Said base 19 is further provided with a radial recess 21, which, however, does not extend through the periphery of said base 19, but does communicate with bore 20, for seating therewithin jaw 22, and within which the latter is adapted for shifting movement. The operative edge of said jaw 22 is arcuate as at 23 for engaging the periphery of work 18.

Passed through the periphery of said base 19, in a radial direction and substantially centrally of the inner end of said jaw 22 is screw 24 for the purpose of shifting said jaw 22 to or away from bore 20 for the purpose of adjusting said jaw depending upon the diameter of work 18. Locknut 25 upon screw 24 when in contact with the periphery of base 19 locks said screw 24 in its adjusted position, thereby maintaining jaw 22 in its rigid position with respect to work 18.

At a point diametrically opposite from recess 21 slot 26 is made in the body of base 19, which is in communication with bore 20, for seating therewithin cam 27, which is integrally formed with lever 15.

Coil spring 28 attached by one of its ends to lever 15 and adjacent the periphery of base 19, and to screw 29 by its opposite end, tends to maintain cam 27 in engagement with work 18.

When lever 15 is shifted against the tension of spring 28, cam 27 is entirely brought out from the path of bore 20, thereby permitting insertion of work 18 within bore 20, preparatory to the placing of said work and of the lathe dog within the lathe.

To complete the structure of the lathe dog an annular closure plate 30 is provided with a central bore 31 corresponding to the diameter of bore 20 in said base 19. At two diametrically opposite points in base 19 countersunk bores 32 are made to receive screws 33, which, by their threaded ends, pass through and engage plate 30, their ends being flush with the outer face of said closure plate 30. Heads of said screws 33 remain countersunk within said base 19, as is seen in Fig. 5.

Pin 34 passing through base 19 and closure plate 30, as well as cam 27 provides a pivot for the latter upon which it is adapted for rotary shifting movement on actuation of lever 15, as is hereinabove described.

Made in closure plate 30 and in the path of one of side edges of jaw 22 is bore 35 for receiving therewithin head of screw 36, the threaded end of which engages and passes through base 19. An annular depression 37, which is in alinement with bore 35 is made upon the inner face of base 19 for the purpose of providing play for the head of said screw 36. Head of screw 36, engaging jaw 22, as is seen in Fig. 6, provides frictional means for maintaining said jaw 22 in position when the same is in the process of adjustment by screw 24, thereby preventing excessive and uncalled-for shifting of said jaw 22 within recess 21 when it is being adjusted by said screw 24.

When work 18 has been placed within bores 20 and 31, with cam 27 engaging it by virtue of the tension exerted upon lever 15 by spring 28, said work as well as the lathe dog thereupon are both placed within pins 13 and 17. Pin 14 coming in contact with lever 15, and transversely thereof, and operating thereagainst from the edge opposite from that at which spring 28 engages the same, tends to maintain cam 27 in its operative gripping engagement with work 18, and independently of the action of spring 28, assuming of course that pin 14 with its face plate 12 revolve into a counterclockwise direction when viewed from the showing made in Figs. 2 and 4. When the work and the lathe dog are removed from the lathe shifting of lever 15 into the opposite direction, or against the tension of spring 28, will shift cam 27 into slot 26, out of the path of bores 20 and 31, and out of its engagement with work 18, and thereupon the lathe dog may be removed without any difficulty from work 18.

While there is described herein a preferred embodiment of the present invention, it is nevertheless to be understood that minor changes may be made therein without departing from the spirit and scope of the invention as claimed.

What I claim as new is:

A lathe dog comprising a casing, said casing being provided with a recess and a slot, a jaw receivable within said recess, a cam rotatably mounted in said slot, a closure plate attachable to said base for maintaining said jaw and said cam in their operative positions within said base, said base and said closure being provided with alined bores for receiving therewithin the work to be clamped therewithin by said jaw and said cam for rigidly locking the same to said base and said closure plate, means for shifting said jaw within said recess in contact with said work and for rigidly locking the same in engagement with said work, and means for frictionally engaging said jaw with said base during the shifting movement of said jaw on operation of said first named means, said last named means including a bore made in said closure plate and partially in the path of the edge of said jaw and a screw in threaded engagement with said base, the head of the screw being seated within said last named bore for frictionally engaging the edge of said jaw.

RICHARD W. BARGGREN.

REFERENCES CITED

The following references are of record in the file of this patent:

UNITED STATES PATENTS

| Number | Name | Date |
| --- | --- | --- |
| 497,517 | Ehrhardt | May 16, 1893 |
| 1,195,818 | Ingham | Aug. 22, 1916 |
| 1,419,452 | Fraser | June 13, 1922 |